F. J. SCHNEIDER.
GANG PLOW.
APPLICATION FILED SEPT. 10, 1915.
1,201,644.
Patented Oct. 17, 1916.
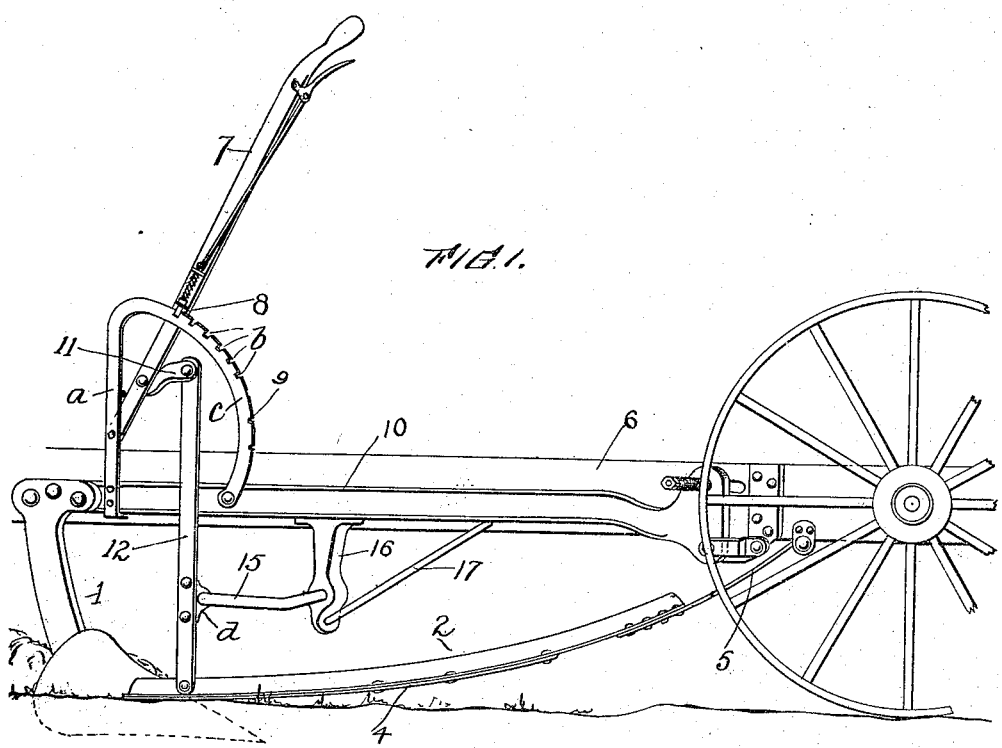
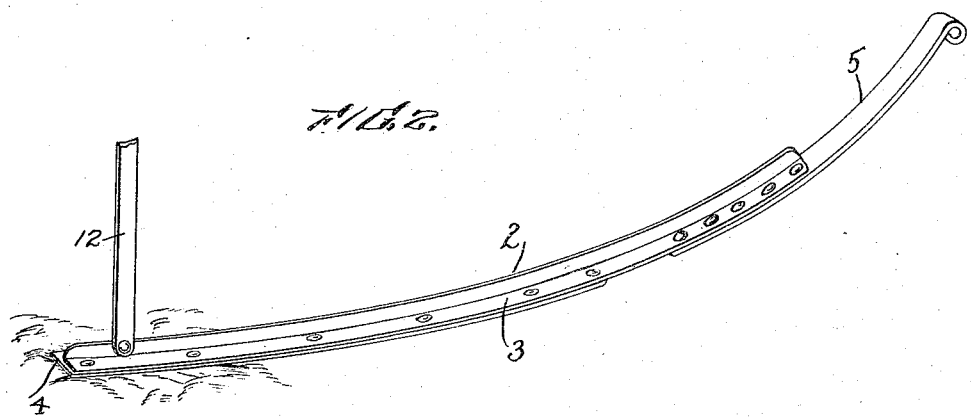
Witness
Inventor
F. J. Schneider
By
Attorney

UNITED STATES PATENT OFFICE.

FREDERICK J. SCHNEIDER, OF WESTON, ILLINOIS.

GANG-PLOW.

1,201,644.

Specification of Letters Patent. Patented Oct. 17, 1916.

Application filed September 10, 1915. Serial No. 49,880.

*To all whom it may concern:*

Be it known that I, FREDERICK J. SCHNEIDER, a citizen of the United States, residing at Weston, in the county of McLean and State of Illinois, have invented certain new and useful Improvements in Gang-Plows, of which the following is a specification.

This invention relates to improvements in gang-plows generally, more particularly guides, shoes or skids therefor.

The invention has for its object to provide for controlling the depth of ground penetration of the plow and to guide the movement of the plow along the ground-surface, after the fashion of the ordinary guide-wheel generally used for that purpose.

The invention consists therefore of certain instrumentalities and features of construction substantially as hereinafter fully disclosed and defined by the appended claims.

In the accompanying drawing is illustrated the preferred embodiment of my invention, wherein it will be understood that various changes and modifications may be made as to the detailed construction and arrangement of parts without departing from the scope of the claims, and in which drawing—

Figure 1 is a mutilated showing in side elevation of a gang-plow, with my invention applied thereto. Fig. 2 is a detached perspective view of the invention, the lever attaching member being partially broken off.

In carrying out my invention, I provide for each plow 1 of the gang a sled runner like shoe 2 comprising a longitudinally curved bar 3. This bar is of right angular form in cross section and has riveted or otherwise secured to its bottom or base portion at the rear end thereof a second flat longitudinally curved bar 4 which is of greater width than the bar 2 and rests upon the ground surface adjacent or along the side of the plow, as shown in Fig. 1, said shoe serving as a guide for the plow and controlling the depth of the furrow. The front end of the shoe has suitably secured thereto the bar 5, whereby it is loosely or pivotally connected to the plow frame. A hand or manually actuated lever 7 equipped with a spring pressed pawl 8 is pivoted to the vertical arm *a* of an upright rack 9 secured to the plow beam 10, the spring pressed pawl of the hand lever being adapted to engage any one of a longitudinal series of spaced notches *b* in the upper edge of the curved or arc-shaped portion *c* of said rack. Said hand-lever, which is disposed vertically, is connected by a link 11 with the upper end of an upright bar 12 loosely connected at its lower end to the rear end of the shoe, whereby it is apparent that by suitably actuating said lever the shoe may be so adjusted or positioned as to provide for the guidance of the plow along the ground surface and for controlling the depth of the furrow. The upright bar 12 is held against lateral displacement by a rod or link 15 pivoted at its front end to the lower end of the pendant or bracket 16 secured in any suitable way to the plow beam and loosely or slidably connected at its rear end with the lower end of the upright bar 12 by the clip or keeper *d*. The pendant or bracket 16 is braced by the upwardly inclined brace rod 17 connected at opposite ends to the bracket and plow beam, respectively. The forward or outer end of the link 11 is loosely connected to the upper end of the upright bar 12 and its rear end rigidly connected to the hand lever 7. The front end of the link or rod 15 is pivoted to the lower end of the pendant or bracket 16, as above stated, to swing in a vertical plane and its rear end slidably engaged with the lower end of the upright bar 12, whereby said bar is held against lateral displacement, as above suggested, but permitted to move from an upright to a forwardly inclined position or vice versa, in lowering or raising the hand lever.

I claim—

1. An attachment for cultivators comprising a shoe loosely connected at its front end with the cultivator frame and arranged for engaging the ground surface adjacent the plow, a rack mounted on the rear end of the plow beam, a hand lever pivoted to said rack, an upright bar loosely connected at its lower end to the rear end of said shoe, and a link effecting a connection between the upper end of said upright bar and said hand lever, said link being rigidly connected with the hand lever and loosely connected with the upright bar, and means for holding the lower end of said upright link against lateral displacement, said means comprising a bracket secured to and depending from the plow beam and a horizontal link pivoted to the lower end of the bracket to swing in a vertical plane and loosely or slidably engaged with the lower end of the upright bar.

2. An attachment for cultivators comprising a shoe loosely connected at its front end with the cultivator frame and arranged for engaging the ground surface adjacent the plow, a rack mounted on the rear end of the plow beam, a hand lever pivoted to said rack, an upright bar loosely connected at its lower end to the rear end of said shoe and a link effecting a connection between the upper end of said upright bar and said hand lever, said link being rigidly connected with the hand lever and loosely connected with the upright bar, and means for holding the lower end of said upright link against lateral displacement, said means comprising a bracket secured to and depending from the plow beam and a horizontal link pivoted to the lower end of the bracket to swing in a vertical plane and loosely or slidably engaged with the lower end of the upright bar, and an upwardly inclined brace between the lower end of said bracket and the plow beam.

3. An attachment for cultivators comprising a shoe loosely or pivotally connected at its front end to the planter frame and adapted to engage the ground surface at its rear end adjacent the plow, said shoe comprising a longitudinally curved upper bar of right angular form in cross section and a second longitudinally curved smooth bar of greater width than that of the upper bar attached to the bottom face of the latter, a rack secured to the rear end of the plow beam, a hand lever pivoted to said rack, an upright link loosely connected at its lower end with the rear end of the upper bar of said shoe and a link for connecting the upper end of said upright bar with said lever, said link having a loose connection with the former, and a rigid connection with the latter, for the purpose specified.

In testimony whereof I affix my signature in the presence of two witnesses.

FREDERICK J. SCHNEIDER.

Witnesses:
ELLA GREEDER,
ROBERT HENNING.

Copies of this patent may be obtained for five cents each, by addressing the "Commissioner of Patents, Washington, D. C."